Figure 1:
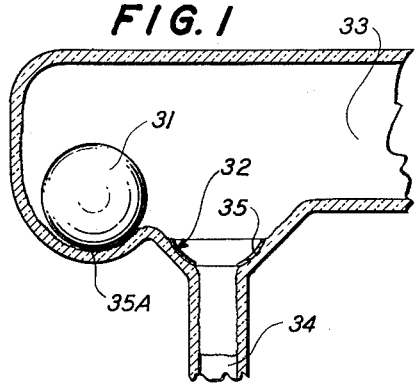

Nov. 27, 1956

B. B. DAYTON 2,771,900

LIQUID SEALS

Filed June 22, 1953

INVENTOR.
BENJAMIN B. DAYTON

BY James B Christie

ATTORNEY

United States Patent Office 2,771,900
Patented Nov. 27, 1956

2,771,900

LIQUID SEALS

Benjamin B. Dayton, Rochester, N. Y., assignor, by mesne assignments, to Consolidated Electrodynamics Corporation, Pasadena, Calif., a corporation of California Application June 22, 1953, Serial No. 363,170

3 Claims. (Cl. 137—251)

This invention relates to devices employing liquid seals and particularly to devices in which liquid seals are employed under high vacuum.

In equipment operated under high vacuum it is frequently necessary to seal two zones from each other, for example two zones between which a differential pressure exists. Mercury seals have been proposed for this purpose but have not proved entirely satisfactory, because mercury has relatively high vapor pressure and in consequence may be evaporated within the equipment, causing contamination.

I have developed seal structures employing gallium which overcome completely the defects inherent in mercury seals in high vacuum equipment. Gallium, which becomes liquid at 29.75° C., or approximately at room temperature, has a lower vapor pressure than mercury. Gallium also has another interesting property in that it wets and adheres to smooth surfaces, particularly smooth glass surfaces, but does not wet or adhere to rough surfaces, say ground or etched glass surfaces, unglazed porcelain or etched or sand blasted metal. I make use of these two properties of gallium, by roughening a solid surface of seals where the liquid sealant should not adhere and employing smooth surfaces where it is desirable that the liquid sealant (gallium) should adhere. Thus, my invention contemplates a conduit containing a valve having two parts with matching surfaces and means for moving the surfaces close to each other to close the valve and remote from each other to open the valve, at least one of the matching surfaces being so smooth that gallium will adhere to it, the smooth surface being surrounded by an adjacent roughened surface to which gallium will not adhere, and a film of liquid gallium on the smooth surface.

Another type of sealing device employing gallium and making use of its two aforementioned properties is described and claimed in my co-pending continuation-in-part application Serial No. 558,382, filed January 10, 1956.

My invention contemplates a valve which comprises two solid members movable with respect to each other and having matching surfaces adapted to be brought close together when the valve is closed. At least one of these surfaces is so smooth that it is wetted by gallium, and adjacent surfaces on the member having said smooth surface are rough so that they are not wetted by gallium. A film of gallium is disposed on the smooth surface and adheres thereto, acting as a seal when the two members are brought close together. The rough surfaces are not wetted by the gallium, and since they surround the film, prevent it from migrating and hold it in place as a sealant.

Gallium is an expensive material, and it is important that it should not "hang up" excessively in conduits through which it passes, since the gallium thus retained serves no useful purpose. Accordingly, one aspect of my invention contemplates the combination of a conduit having a rough interior surface and a body of gallium in contact with the surface but incapable of wetting it because of its roughness. The roughened interior may be etched or ground glass, unglazed ceramic, sand blasted metal, etc.

It is not necessary to employ chemically pure gallium in the practice of the invention, excellent results having been obtained with commercial gallium of about 99.5% purity, the principal impurities being iron and lead.

Figure 2:
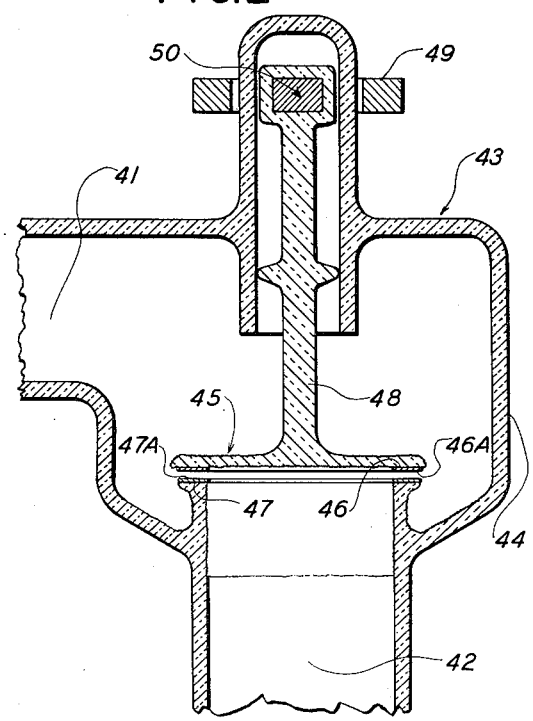

These and other aspects of my invention will be understood more thoroughly in the light of the following detailed description taken in conjunction with the accompanying figures in which:

Fig. 1 is a diagram, in vertical section, of a valve in which a ball may be seated on a gallium film to close a conduit; and Fig. 2 illustrates in vertical section a globe-type valve in which a gallium film is employed as a seal between an annular seat and a plug or cap.

Fig. 1 shows a form of the invention in which a steel ball 31 (preferably having a rough surface) may be placed in a glass seat 32 to seal the space 33 from the space 34. The surface of the glass seat is smooth to insure wetting with gallium 35. In order to close the valve the ball is moved, say by means of a magnet outside the valve until it rolls out of its rest or pocket 35A into position in the smooth glass seat. The valve may also be unseated by a reverse procedure. It should be noted that the surface area around the smooth glass seat is roughened to prevent migration of the gallium from the smooth glass surface.

Fig. 2 shows in vertical section another modification of my invention in which horizontal conduit 41 is to be sealed from vertical conduit 42 by means of valve 43 having a body 44 into which the two conduits extend. A valve 45 sits against the end of the lower conduit. The valve has a smooth surface 46 which can be placed into close contact with the smooth surface 47 of the lower conduit. Each of these smooth surfaces is wetted with films of gallium 46A, 47A and the surfaces around these gallium-wetted surfaces are roughened to prevent the spreading of the gallium. The valve is operated to open and close by means of a valve stem 48 which can be actuated by the external magnet 49 operating on the magnetic material 50 in the upper portion of the valve stem.

I claim:

1. In a device having a conduit with a liquid seal therein, the combination which comprises a valve in the conduit having two parts with matching surfaces and means for moving the surfaces close to each other to close the valve and remote from each other to open the valve, at least one of the matching surfaces being so smooth that gallium will adhere to it, the smooth surface being surrounded by an adjacent roughened surface to which gallium will not adhere, and a film of liquid gallium on the smooth surface.

2. Apparatus according to claim 1 in which the smooth surface coated with gallium is annular and is disposed around the conduit.

3. Apparatus according to claim 1 in which both the matching surfaces are annular and smooth.

References Cited in the file of this patent

UNITED STATES PATENTS

| 960,912 | Heany | June 7, 1910 |
| 2,374,531 | Flory | Apr. 24, 1945 |
| 2,642,891 | Harrison | Dec. 18, 1953 |
| 2,693,198 | Heath | Nov. 2, 1954 |

FOREIGN PATENTS

| 562,212 | Germany | Nov. 24, 1932 |
| 440,195 | Great Britain | Dec. 18, 1935 |

OTHER REFERENCES

"Journal of Metals," pub. date February 1951, vol. 191, issue 2, pp. 91 to 94. (Copy in Div. 3.)

"Thorpe's Dictionary of Applied Chemistry," published by Longmans, Green and Co., vol. V (Feh-Glass) pp. 418, 419. (Copy in Div. 59.)